(12) United States Patent
Zampini et al.

(10) Patent No.: US 9,903,075 B2
(45) Date of Patent: Feb. 27, 2018

(54) METHOD FOR PLACEMENT OF ROLLER COMPACTED CONCRETE (RCC) ON A SUB-BASE TO PRODUCE A CONCRETE PAVEMENT

(71) Applicant: CEMEX RESEARCH GROUP AG, Brügg b. Biel (CH)

(72) Inventors: Davide Zampini, Lyss (CH); Alexandre Guerini, Cressier NE (CH); Carsten Zanders, Worben (CH); Giovanni Volpatti, Aegerten (CH)

(73) Assignee: CEMEX RESEARCH GROUP AG, Brügg B. Biel (CH)

( * ) Notice: Subject to any disclaimer, the term of this patent is extended or adjusted under 35 U.S.C. 154(b) by 0 days.

(21) Appl. No.: 15/300,458

(22) PCT Filed: Apr. 9, 2014

(86) PCT No.: PCT/EP2014/057144
§ 371 (c)(1),
(2) Date: Sep. 29, 2016

(87) PCT Pub. No.: WO2015/154802
PCT Pub. Date: Oct. 15, 2015

(65) Prior Publication Data
US 2017/0107673 A1    Apr. 20, 2017

(51) Int. Cl.
*E01C 7/00* (2006.01)
*E01C 7/14* (2006.01)
(Continued)

(52) U.S. Cl.
CPC ............... *E01C 7/14* (2013.01); *C04B 14/06* (2013.01); *C04B 24/2605* (2013.01);
(Continued)

(58) Field of Classification Search
CPC .......... E01C 7/14; E01C 7/142; E01C 19/002; E01C 19/46; C04B 24/2605;
(Continued)

(56) References Cited

U.S. PATENT DOCUMENTS 4,144,086 A * 3/1979 Helgesson .............. C04B 28/02
106/724
4,892,586 A    1/1990 Watanabe
(Continued)

FOREIGN PATENT DOCUMENTS

| GB | 2390847 A | 1/2004 |
|---|---|---|
| JP | 3147832 U | 1/2009 |
| JP | 2009126761 A | 6/2009 |

OTHER PUBLICATIONS

Lin et al., "A new mix design method for steel fibre-reinforced, roller compacted and polymer modified bonded concrete overlays", Construction and Building Materials, 2013, vol. 48, pp. 333-341.
(Continued)

*Primary Examiner* — Raymond W Addie
(74) *Attorney, Agent, or Firm* — Lucas & Mercanti, LLP

(57) ABSTRACT

A method for placement of roller compacted concrete (RCC) on a sub-base to produce a concrete pavement, which has: (a) dosing a concrete or concrete ingredients and loading the concrete or concrete ingredients into a concrete transportation truck, (b) adding at least one pelletizing agent to the concrete and waiting from 3 to 15 minutes under constant mixing to produce a pelletized concrete and (c) discharging the pelletized concrete obtained in step (b) on the sub-base from the concrete transportation truck, rotating the drum of the concrete transportation truck.

13 Claims, 4 Drawing Sheets

(51) Int. Cl.
    *C04B 28/04*     (2006.01)
    *C04B 40/06*     (2006.01)
    *E01C 19/00*     (2006.01)
    *C04B 14/06*     (2006.01)
    *C04B 24/26*     (2006.01)
    *C04B 24/34*     (2006.01)
    *E01C 19/46*     (2006.01)
    *C04B 111/00*     (2006.01)
    *C04B 111/60*     (2006.01)
    *C04B 103/10*     (2006.01)
    *C04B 103/30*     (2006.01)
    *C04B 103/32*     (2006.01)

(52) U.S. Cl.
    CPC .......... *C04B 24/2623* (2013.01); *C04B 24/34* (2013.01); *C04B 28/04* (2013.01); *C04B 40/0625* (2013.01); *E01C 7/142* (2013.01); *E01C 19/002* (2013.01); *E01C 19/46* (2013.01); *C04B 2103/10* (2013.01); *C04B 2103/304* (2013.01); *C04B 2103/32* (2013.01); *C04B 2111/0006* (2013.01); *C04B 2111/00051* (2013.01); *C04B 2111/0075* (2013.01); *C04B 2111/60* (2013.01)

(58) Field of Classification Search
    CPC ..... C04B 24/2623; C04B 24/34; C04B 14/06; C04B 28/04; C04B 2303/10; C04B 2103/32; C04B 2103/304; C04B 2111/0075

USPC .................. 404/17, 72, 75, 117, 118
    See application file for complete search history.

(56) References Cited

U.S. PATENT DOCUMENTS

| | | | | |
|---|---|---|---|---|
| 5,004,799 | A * | 4/1991 | Kohls | C04B 40/06 106/724 |
| 5,173,117 | A | 12/1992 | Inokawa | |
| 2008/0072799 | A1* | 3/2008 | Jau | C04B 24/2641 106/739 |
| 2013/0167756 | A1* | 7/2013 | Chen | C04B 12/00 106/706 |
| 2014/0296370 | A1* | 10/2014 | Ferrari | C04B 18/021 523/122 |
| 2015/0016886 | A1* | 1/2015 | Frelich | F02D 41/0205 404/84.05 |

OTHER PUBLICATIONS

Yerramala et al., "Transport properties of high volume fly ash roller compacted concrete", Cement & Concrete Composites, 2011, vol. 33, No. 10, pp. 1057-1062.
Rendchen et al., "Erfahrung mit Verkehrsflachen aus Walzbeton in Deutschland", Aktuelles zum Thema Betonstrassen: update, 2006, pp. 1-8.
International Search Report and Written Opinion for International Application No. PCT/EP2014/057144 (dated 2015) (13 pages).

* cited by examiner

METHOD FOR PLACEMENT OF ROLLER COMPACTED CONCRETE (RCC) ON A SUB-BASE TO PRODUCE A CONCRETE PAVEMENT

CROSS REFERENCE TO RELATED APPLICATION

This application is a 371 of PCT/EP2014/057144 filed on Apr. 9, 2014, of which is incorporated herein by reference.

FIELD OF THE INVENTION

The present invention relates to traditional Roller Compacted Concrete (RCC), a zero-slump concrete used in pavements as an alternative to asphalt. Particularly, the present invention relates to a method for placement of roller compacted concrete (RCC) on a sub-base to produce a pavement.

BACKGROUND OF THE INVENTION

Nowadays, traditional Roller Compacted Concrete (RCC), a zero-slump concrete used in pavements as an alternative to asphalt, is mixed in a central mix plant or using a continuous flow pug mill. RCC is required to have zero-slump since the concrete mixture needs to support a roller on its unhardened state. For effective consolidation, the concrete mixture needs to be dry enough to prevent sinking of the roller or vibratory equipment but plastic/wet enough to allow satisfactory distribution of the binder during the mixing and vibratory compaction operations. The zero-slump consistency is the adequate for this aim. RCC is normally placed using an asphalt paver (widely available, cost effective and versatile with respect to the size and width of the road to build) and/or a roller or only a roller once the RCC concrete has been distributed evenly to compact the concrete on the sub-base.

Pug mills have been around since early 1800s and are a piece of machinery used to grind and mix wet and dry materials, usually clay or asphalt, but also for RCC. It is a mobile equipment, erected on site. Generally, a pug mill consists of one or more containers and one or more rotating arms with blades or paddles attached to them. It acts as a blender, forming a smooth material that is easy to work with.

Pug mills are used from mid-size to high-volume applications. Typical pug mill capacities range from 100 m³ to over 400 m³ per hour.

Central mix plants are equipped with their own mixer. However, zero-slump concrete is very problematic to extract from the mixer and is more difficult to clean, since it causes more buildup and requires longer cleaning time. When using a central mix, transportation of RCC is done through means of a dump truck.

Both methods need special equipment (pug mills or dump trucks), not readily available for most ready-mix producers, representing a heavy investment.

Also, an extra disadvantage presented by the pug mill is that, since it is a continuous method, one has little or no control over the mix proportioning—dosage of fine and coarse aggregates as well as of sand, cement and water—, leading to homogeneity consistency problems, yielding to a product poor in consistency, with differential shrinkages, cracks formations on the placed concrete etc.

The continuous pug mill is not suitable for small applications, since the continuous pug mill is employed in high-volume applications, typically having a capacity ranging from 100 to over 400 m³/hr. These capacities are far too much compared to what is needed for small projects, making RCC a poor choice for such jobs. For smaller projects, the ideal method would be using conventional equipment employed for ready-mix, however drum mixer trucks are not appropriated due to impossibility to discharge conventional RCC from the chute, due to its zero-slump consistency. For smaller capacities/projects, there is the need for a new solution.

Pugs are usually associated with special concrete pavers (not RCC) that are huge and expensive equipments designed for large and long highways with multi lanes in order to absorb the costs of such equipment. Concrete pavers normally would not require any post-process rolling.

Traditional ready-mix equipment encompasses:
Wet mix plant, also called a central plant, where a concrete batch is made up by an operator before it is loaded into the truck. These plants have a mixer and offer producers more control over the quality and consistency of the concrete mix.
Dry mix plants are plants without a mixer, where the dry components of concrete are weighted and loaded separately into a mixer, normally the concrete truck. Water is then added and the final mix is made. Once the water is added, the mixer starts to rotate to maintain the material's liquid state until it is ready to be discharged into the truck.
Concrete trucks, also called in-transit mixers, are made to transport concrete to the jobsite while mixing it. They can be loaded in any of the mix plants mentioned above; they maintain the material's liquid state by turning the drum until delivery. The interior is fitted with a spiral blade which, in one rotational direction, pushes the concrete deeper into the drum (direction the drum rotates while transporting the concrete to the jobsite) and, turning on the other direction, discharges the concrete out of the drum. From there, the concrete can be unloaded by a chute or into a concrete pump.

But typical ready-mix equipment yields various problems and precludes their use for RCC nowadays:
Discharging of a zero-slump concrete from a wet mixing plant, also known as central plant, is difficult, promotes buildup of material in the equipment, therefore longer cleaning procedures are needed.
Dry mix plants (where the concrete truck is operating as a mixer) cannot be used directly since zero slump concrete could not be discharged from the concrete truck, making the downhill step of the pavement placing, including evenly distribution of the material and flattening with a roller, impossible.
Delivery of a no zero-slump concrete is not accepted for RCC; a zero slump concrete is needed to comply with the final product's characteristics—the concrete mixture needs to be dry enough to prevent sinking of the roller or vibratory equipment but plastic/wet enough to allow satisfactory distribution of the binder during the placement, including homogeneously distribution of the material and/or vibration and rolling.

Therefore, neither dry mix or wet mixing plants and related concrete transportation equipment can be used to successfully achieve RCC delivery.

However, the use of conventional ready mix production and transportation would be ideal in terms of production capacity (4 to 100 m³ per hour) for smaller or shorter roads than highways and multilane roadways. Those smaller projects would use the nominal plant capacity and could not use the huge production related to pug mill technology. Furthermore, pug mill has to work permanently (no stop and restart) since the stoppage will affect the consistency, homogeneity of the mix and consequently, the final product's quality.

The ideal method would pass by using traditional ready-mix equipment, but due to the zero-slump consistency, it is very difficult if not impossible to unload the material from the ready-mix trucks.

Furthermore, zero slump concrete would require more sophisticated equipment to homogeneously distribute the concrete on the sub-base before compaction, typically said distribution is done using a dedicated paver.

A paver is a piece of equipment used to lay asphalt or zero-slump concrete on the sub-base when a pavement, road, bridge, parking lot or other such infrastructure is being built. It lays the asphalt or concrete flat and provides minor compaction before the roller.

A roller is a vehicle that compacts asphalt or concrete, but also soil or gravel during the construction of infrastructure using those said materials.

Existing inventions describe methods wherein residual, unset concrete is transformed into granular materials that can be used as aggregates. No invention has so far disclosed a method to granulate liquid, fresh concrete and further use this concrete as RCC or any additional application other than recycled aggregates.

JP 3147832 describes a material for the treatment of residual concrete which allows the recycling of remained concrete. The aforementioned material is made of a super-absorbing polymer in powder or granular form preserved in a casing formed of water-soluble paper.

When the material is added into the mixer where the residual concrete is, the casing of water-soluble paper dissolves and the super-absorbing polymer gets in contact with the residual concrete. Through the rotation of the mixer, the super-absorbing polymer absorbs part of the water present in the residual concrete and swells, forming a gel which contains cement and other fine particles. This arrangement covers the aggregates and produces a granular material which can be discharged from the mixer and used as a roadbed filling material.

JP 2009126761 discloses a flocculating agent for agglomeration of surplus ready-mix concrete in a drum and preventing the fluidity of the ready-mix concrete. The flocculating agent for agglomeration of surplus ready-mix comprises a polymer absorber as a dispersant which is selected from the group consisting of polyacrylics, polyvinylalcohols, polysaccharides and proteins and capable of absorbing water in a dispersive medium, including organic solvents, a salt solution or the like.

WO2012084716 describes a method for producing aggregates from unset residual concrete using both flash setting accelerators, which include calcium aluminate hydrates forming compounds and sodium silicates, plus a super absorbent polymer, specifically cellulose, chitosan, collagen and other synthetic polymers. Both these ingredients are mixed directly in the truck mixer until granular materials are formed. When the flash setting accelerators mentioned in the invention are added to the concrete surplus, they react with the water to form calcium aluminate hydrates; the consumption of these water molecules causes the drying of the residual concrete and a sharp reduction of the workability. Then, the super-absorbent polymer absorbs additional water molecules and swell, forming a gel network structure which incorporates cement, the calcium aluminate hydrates crystals and the other fine components of the concrete, like sand and fillers, forming a granular material.

It can be easily understood that the combination of admixtures in this case aims at accelerating the set of the concrete to produce hardened aggregates in the shortest time possible. Therefore, the present invention proposes a unique and novel method to use conventional ready mix equipment to mix and to deliver concrete to manufacture roller compacted concrete roads, using an asphalt paver or motor grader or a roller or any combination of them.

DESCRIPTION OF THE INVENTION

The present invention provides a Method for placement of roller compacted concrete (RCC) on a sub-base to produce a concrete pavement, comprising:
(a) dosing a concrete or concrete ingredients and loading said concrete or concrete ingredients into a concrete transportation truck,
(b) adding at least one pelletizing agent to the concrete and waiting from 3 to 15 minutes under constant mixing to produce a pelletized concrete and
(c) discharging the pelletized concrete obtained in step (b) on the sub-base from the concrete transportation truck, rotating the drum of the concrete transportation truck, in the following, method of the invention.

In step (a) of the method of the invention, the concrete produced has preferably a consistency selected from the group consisting of S1, S2, S3, S4 and S5, more preferably a consistency selected from the group consisting of S2, S3 and S4. S1 to S5 consistencies are slump test's consistencies, according to table 3 of the European Standard EN 206-1:2000.

Typical admixtures such as water reducers superplasticizers (e.g. based on melamine, naphthalene, lignosulfonate or polycarboxylates) can be used to optimize the consistency and the mix design.

For example, a S3 slump class concrete is a concrete that, after performing the concrete slump test, has a slump value between 100 and 150 mm.

An advantage of using not S0 concrete is related to the fact that more fluid concrete (S1-S5) enables a much better mixing of the ingredients, thus enabling to better distribute the cementitious material in mix and/or to incorporate various additions that will be homogeneously distributed into the mix (admixtures, mineral additions, fillers, fibers, etc.).

As a result, the quality and the strength development as well as the final strength and properties of the RCC placing method according to the invention are higher than in the case where S0 slump concrete is used.

Another advantage according to the invention is that the use of more fluid concrete mixes than S0 enables to either reduce the quantity of cementitious materials below 300 Kg/m$^3$ of concrete, respectively below 280 Kg/m3 of concrete or to achieve higher resistances to allow higher speeds for the vehicles circulating on the finished pavement, to allow reducing the thickness of the RCC placed layer.

In step (c) of the method of the invention, the pellets can be placed with a paver, for example, the paver can be fed with the pelletized concrete directly from the concrete transportation truck.

The paver is optional, pellets can be poured from the concrete truck directly to the sub-base and then the roller finishes the job. Alternatively, pellets can be poured first into the paver that then pours the pellets on the road, before the roller acts. Another alternative is to unload the material directly from the concrete truck to the sub-base and use a motor grader or similar equipment to distribute evenly the concrete on the sub-base and finally compact the RCC with a roller.

Depending on the final quality of the road requested, the use of the asphalt paver enables to avoid the use of a roller.

Thus, another embodiment is the method of the invention, wherein the discharge of the pelletized concrete in step (c) is directly done on the sub-base and uniformly distributed manually or mechanically and pressed using a roller. The pelletized concrete could be uniformly distributed using a motor grader, which is a piece of machinery used in construction, more specifically used in creating flat surfaces and in preparing a base course for paved roads.

Another embodiment is the method of the invention, wherein the discharge of the pelletized concrete in step (c) is done into an asphalt paver.

Another embodiment is the method of the invention, wherein the concrete once placed on the sub-base is compacted using a roller.

The roller compacted concrete (RCC) of step (c) once pelletized should be classified as V0 to V2 according to European Standard EN 12350-3:2009 (corresponding to a VEBE time from 10 to 50 seconds). The VEBE time test is described in EN 12350-3:2009, Testing fresh concrete, Part 3: Vebe test.

The fresh concrete is compacted into a conical slump mould and placed on top of a vibrating table. The mould is removed and a clear plastic disc is placed on the top of the concrete. The vibration starts and the time taken for the transparent disc to be fully in contact with the concrete (the Vebe time), is measured.

The main advantage of this test is that it is a dynamic test and can be used on concretes that are too stiff for a slump test.

Concretes classified as V3 or V4 according to European Standard EN 12350-3:2009 (VEBE time below 10 seconds) are not suitable for the method of the present invention, said concretes will sink the roller once applied as RCC.

VEBE time is influenced by the consistency of the concrete of step (a) of the method of the invention and the amount of pelletizing agent. A concrete suitable for step (a) of the method of the invention has an initial paste volume with fillers (cement, water, fines) between 200 and 350 l/m$^3$ and a mortar volume (paste+sand) (cement, water, sand and fines of the gravel (<4 mm)) between 500 and 700 l/m$^3$. The ratio between paste volume/mortar volume is between 0.2 and 0.7.

Thus, another embodiment is the method of the invention, wherein the VB value of said pelletized concrete is classified as V0 to V2.

The roller compacted concrete of step (c) has all the advantages of the traditional RCC with all the advantages of normal ready-mix concrete; it has the capability of being transported and discharged by normal ready-mix trucks, a familiar method that allows full control over the mix and complete adjustment of the product quantity to the constructors' requirements, even for small projects. After discharge, it can be applied as conventional RCC, using a conventional roller.

Pelletizing can be done during transportation as long as pellets are placed as road bed within 1 hour.

Typically, 1 m$^3$ of fresh concrete described in step (a) of the method of the invention comprises 200-400 kg of a cementitious binder, said cementitious binder comprises between 60% to 100% of Ordinary Portland Cement (OPC), more preferably between 70% and 100% of OPC, and supplementary cementitious materials, including but not limited to slag, fly ash, silica fume and natural pozzolans. Furthermore, the fresh concrete described in step (a) is also comprised of aggregates, whereas said aggregates comprise 30-60% (% volume) of sand and 40-70% (% volume) of coarse aggregates. Furthermore, the fresh concrete described in step (a) is also comprised of 0.5% to 3% (w/w) of a superplasticizer (e.g. based on melamine, naphthalene, lignosulfonate or polycarboxylates) and also 0-2% (w/w) of a retarder (e.g., lignin, borax, sugars or tartaric acids and salts). The water-to-cement ratio of said concrete described in step (a) is between 0.4 and 0.6. In some cases, the fresh concrete described in step (a) may also have also 0.1 to 5% (w/w) of self-curing agent and/or 0.1 to 5% (w/w) of an air-entraining agent. Addition of other mineral additives and/or fibers is also possible, since this embodiment will improve the dispersion and bonding of the fibers to the matrix. Fibers improve the durability of the final product by increasing the flexural strength, reducing shrinkage cracking and increasing fatigue strength.

Because the concrete of step (a) is not a zero-slump concrete, the present invention has the extra advantage when compared to the traditional RCC of allowing the use of self-curing and/or air-entraining agents.

Thus, another embodiment is the method of the invention, wherein the concrete of step (a) comprises a self-curing agent and/or an air-entraining agent.

Another embodiment is the method of the invention, wherein the solid active content of said self-curing agent is at a concentration in the range of 0.1 to 5% (w/w).

Another embodiment is the method of the invention, wherein said self-curing agent is selected from the group consisting of polyvalent alcohol, phytosterols, hyaluronic acid, polyxyethylene (POE), sodium pyrrolidone carboxylate (PCA-Na), cetyl alcohol, stearyl alcohol and polyacrylic acid.

Another embodiment is the method of the invention, wherein said polyvalent alcohol is selected from the group consisting of polyethylene glycol (PEG), propylene glycol (PG), dipropylene glycol (DPG), butylene glycol, neopently glycol, xylitol, sorbitol and glycerine.

Another embodiment is the method of the invention, wherein the solid active content of said air-entraining agent is at a concentration in the range of 0.1 to 5% (w/w).

Another embodiment is the method of the invention, wherein said air-entraining agent is selected from the group consisting of salts of wood resins, salts of proteinaceous material, fatty acids, resinous acids, fatty salts, resinous salts, alkylbenzene sulfonate salts, salts of alkyl sulfonates, polyoxyethylene alkyl sulfonate salts, polyoxyethylene alkylaryl ethers, salts of sulfonated lignin and derivatives of hydrocarbon sulfonates.

Normally, after placing traditional RCC, curing is needed to avoid water loss and drying crack. Usually concrete curing is done by spraying or sprinkling water over the concrete surface to ensure that said surface is permanently moist. This prevents the concrete's moisture from evaporating, contributing to the strength gain of the product. By adding self-curing agents to the concrete of step (a), the extra step of curing can be avoided, saving resources and time.

Also, by adding an air-entraining agent, the final product has improved resistance to freeze-thaw when compared to traditional RCC products.

Addition of curing agents, fibers or air entrainers is only possible since the concrete, before pelletizing, has a consistency between S1 and S5.

Such additions would not be possible with a S0 conventional RCC concrete consistency due to the impossibility of homogeneously mixing said components.

The pelletizing operation of the concrete will entrap the fibers and/or the air bubbles resulting from the air entraining agent in the pellets, so that the expected properties are maintained until the concrete is placed with no risk of air losses or agglomeration of fibers.

All natural and artificial aggregates are suitable for the concrete of step (a) of the method of the invention, including but not limited to sands, gravels, quartz, expanded clay, shale, glass, lightweight aggregates, such as pumice, scoria, etc. Coarse aggregates can be round, angular, cubical, rounded, flaky, elongated whereas fine aggregates can be angular, rounded, etc.

Another embodiment is the method of the invention, wherein in step (b) the solid active content of the pelletizing agent is at a concentration in the range of 0.3 to 3 kg/m$^3$ of concrete.

Another embodiment is the method of the invention, wherein said pelletizing agent is selected from the group consisting of cellulose, chitosan, polyacrylics, polyamines, polyvinylalcohols, polysaccharides, collagen, acrylamide, lactic acid, methacrylic acid, methacrylate, hydroxyethyl, ethylene glycol, ethylene oxide, acrylic acid, inorganic flocculants and inorganic coagulants. Preferably, the pelletizing agent is a polysaccharide. This component brings the advantages of being effective, easily available, non-toxic and non expensive.

List of Definitions

Hydraulic binder. It is a material with cementing properties that sets and hardens due to hydration even under water. Hydraulic binders produce calcium silicate hydrates also known as CSH.

Cement. It is a binder that sets and hardens and brings materials together. The most common cement is the ordinary Portland cement (OPC) and a series of Portland cements blended with other cementitious materials.

Ordinary Portland cement. Hydraulic cement made from grinding clinker with gypsum. Portland cement contains calcium silicate, calcium aluminate and calcium ferroaluminate phases. These mineral phases react with water to produce strength.

Hydration. It is the mechanism through which OPC or other inorganic materials react with water to develop strength. Calcium silicate hydrates are formed and other species like ettringite, monosulfate, Portlandite, etc.

Mineral Addition. Mineral admixture (including the following powders: silica fume, fly ash, slags) added to concrete to enhance fresh properties, compressive strength development and improve durability.

Silica fume. Source of amorphous silicon obtained as a byproduct of the silicon and ferrosilicon alloy production. Also known as microsilica.

Fibers. Material used to increase concrete's structural performance. Fibers include: steel fibers, glass fibers, synthetic fibers and natural fibers.

Alumino silicate-by-product (Fly Ash—bottom ash). Alkali reactive binder components that together with the activator form the cementitious paste. These minerals are rich in alumina and silica in both, amorphous and crystalline structure.

Natural Pozzolan. Aluminosilicate material of volcanic origin that reacts with calcium hydroxide to produce calcium silicate hydrates or CSH as known in Portland cement hydration.

Filler inert. Material that does alter physical properties of concrete but does not take place in hydration reaction.

Admixture. Chemical species used to modify or improve concrete's properties in fresh and hardened state. These could be air entrainers, water reducers, set retarders, superplasticizers and others.

Silicate. Generic name for a series of compounds with formula $Na_2O.nSiO_2$. Fluid reagent used as alkaline liquid when mixed with sodium hydroxide. Usually sodium silicate but can also comprise potassium and lithium silicates. The powder version of this reagent is known as metasilicates and could be pentahydrates or nonahydrates. Silicates are referred as Activator 2 in examples in this application.

Initial dispersant. It is a chemical admixture used in hydraulic cement compositions such as Portland cement concrete, part of the plasticizer and superplasticizer family, which allow a good dispersion of cement particles during the initial hydration stage.

Superplasticizers. It relates to a class of chemical admixture used in hydraulic cement compositions such as Portland cement concrete having the ability to highly reduce the water demand while maintaining a good dispersion of cement particles. In particular, superplasticizers avoid particle aggregation and improve the rheological properties and workability of cement and concrete at the different stage of the hydration reaction.

Coarse Aggregates. Manufactured, natural or recycled minerals with a particle size greater than 8 mm and a maximum size lower than 32 mm.

Fine Aggregates. Manufactured, natural or recycled minerals with a particle size greater than 4 mm and a maximum size lower than 8 mm.

Sand. Manufactured, natural or recycled minerals with a particle size lower than 4 mm.

Concrete Ingredients. Concrete is primarily a combination of hydraulic binder, sand, fine and/or coarse aggregates, water. Admixture can also be added to provide specific properties such as flow, lower water content, acceleration, etc.

Workability. The workability of a material is measured with a slump test (see below).

Workability retention. It is the capability of a mix to maintain its workability during the time. The total time required depends on the application and the transportation.

Strength development—setting/hardening. The setting time starts when the construction material changes from plastic to rigid. In the rigid stage the material cannot be poured or moved anymore. After this phase the strength development corresponding to the hardening of the material.

Consistency of the concrete. Consistency reflects the rheological properties of fresh concrete by means of slump as defined below:

TABLE 1

| Consistency of concrete (slump) | | | |
|---|---|---|---|
| EN 206-1 | | NF P 18-305 | |
| Class | slump [mm] | Consistency | slump [mm] |
| S1 | 10 to 40 | Stiff | 0 to 40 |
| S2 | 40 to 90 | Plastic | 50 to 90 |
| S3 | 100 to 150 | highly plastic | 100 to 150 |

TABLE 1-continued

| Consistency of concrete (slump) | | | |
|---|---|---|---|
| EN 206-1 | | NF P 18-305 | |
| Class | slump [mm] | Consistency | slump [mm] |
| S4 | 16 to 210 | fluid | >160 |
| S5 | >220 | | |

EXAMPLES OF THE INVENTION

Example 1

Figure 1:
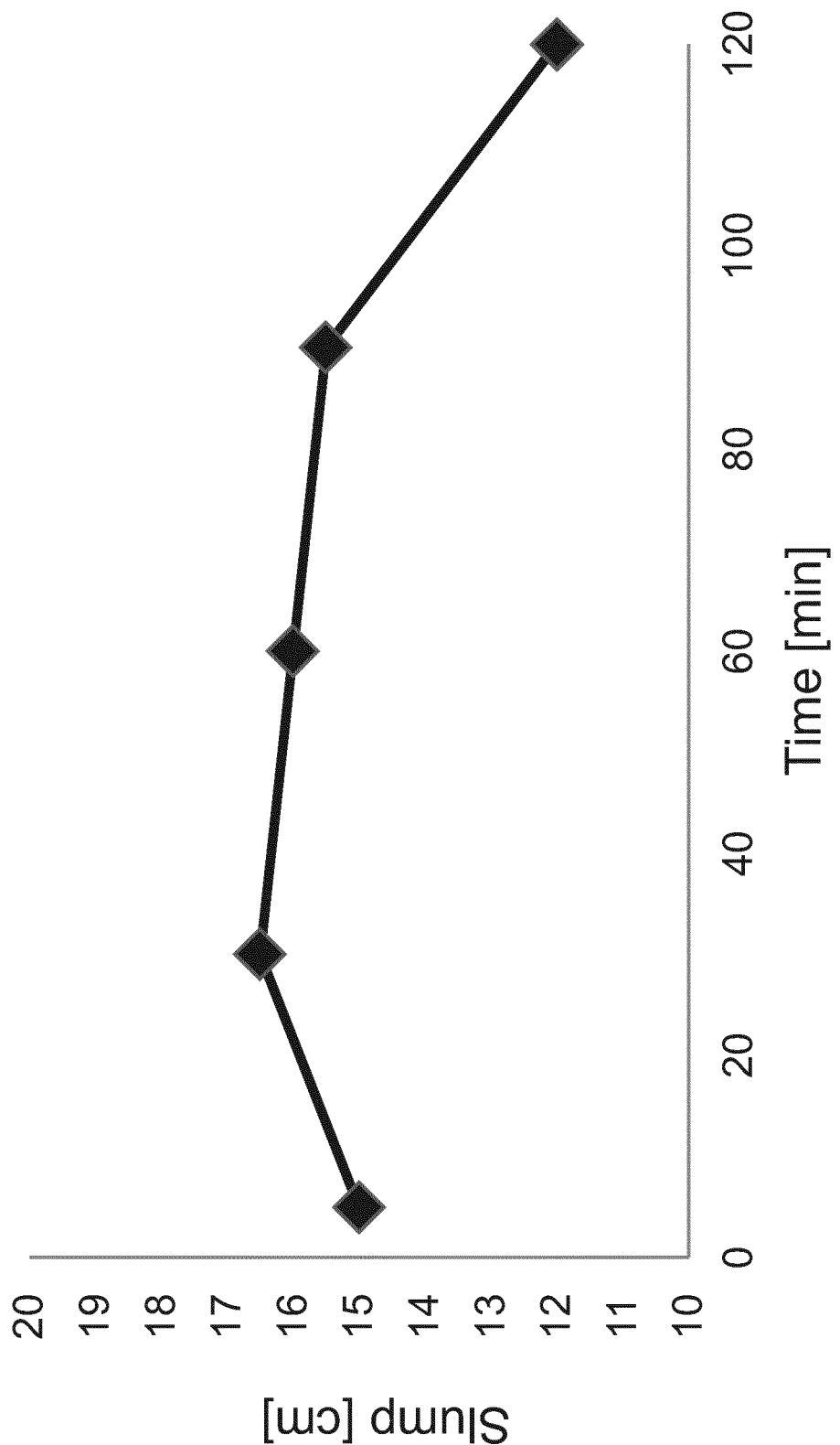
FIG. 1. Slump values of a concrete over time.

S3 slump class concrete was produced and the slump was monitored over time. The results are shown on FIG. 1.

Example 2

Figure 2:
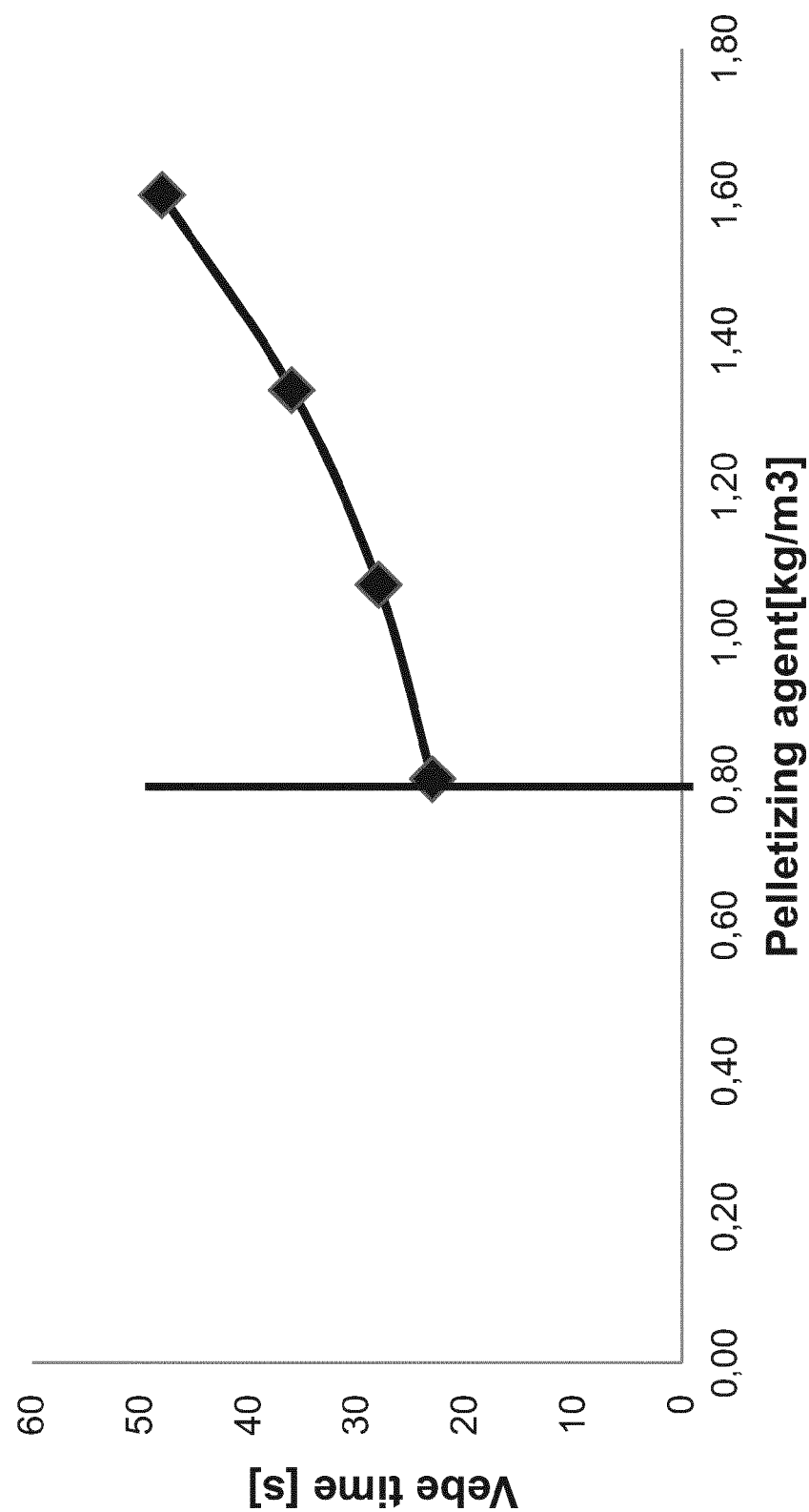
FIG. 2. VEBE time determined according to European Standard EN 12350-3:2009 for concretes with different amounts of pelletizing agent.
Figure 3:
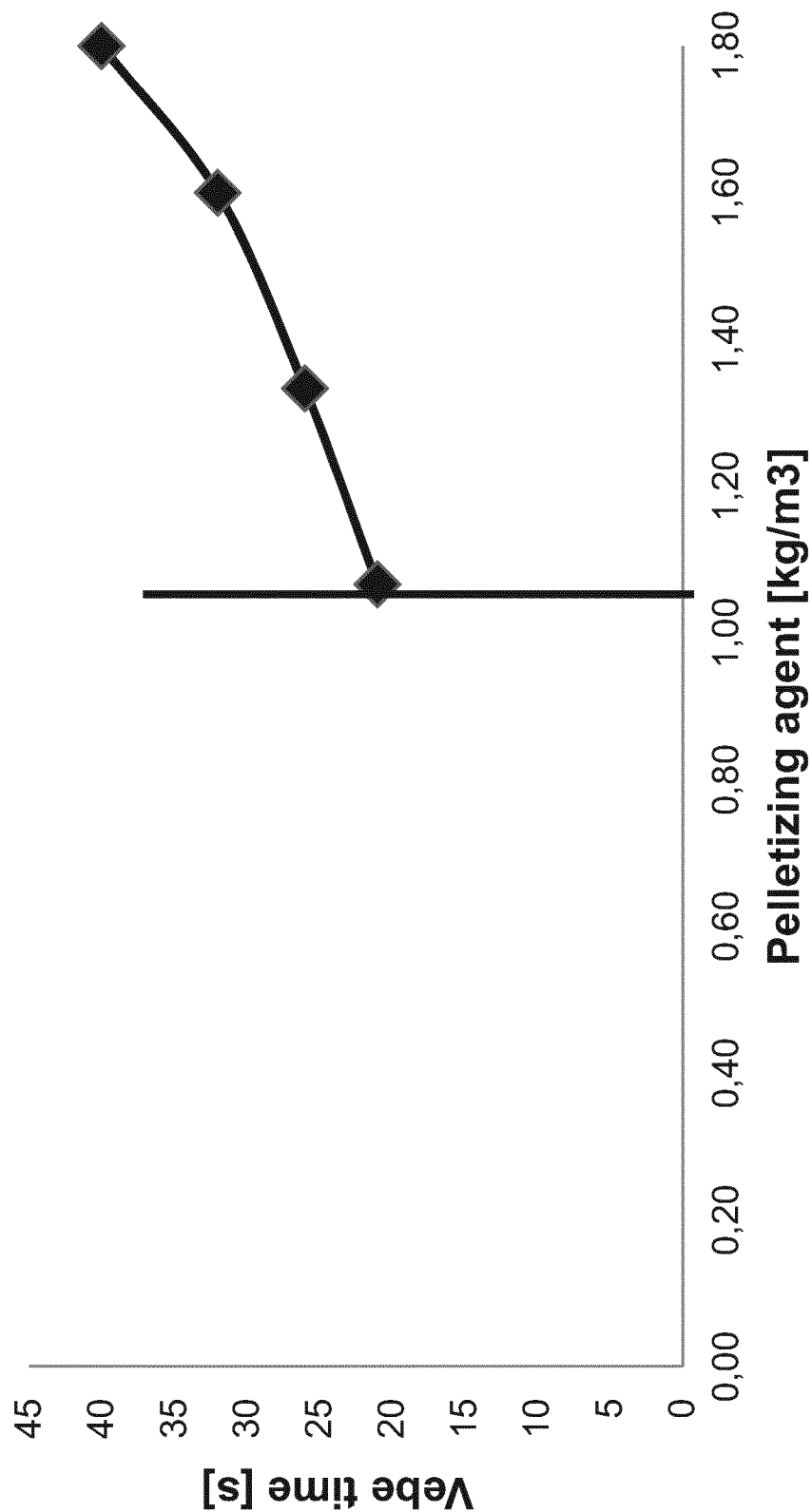
FIG. 3. VEBE time determined according to European Standard EN 12350-3:2009 for concretes with different amounts of pelletizing agent.

S3 slump class concrete was produced, and different amounts of the pelletizing agent were then added. The VEBE time was determined according to European Standard EN 12350-3:2009 for all concretes and the results are shown in FIGS. 2 and 3.

Mix Design

| Cement CEM OPC Optimo 40 R | 230 kg/m$^3$ |
|---|---|
| Water addition | 146 kg/m$^3$ |
| Superplasticizer (PCE) | 2.3 kg/m$^3$ |
| Air-Entrainer (Vinsol Resin) | 2% (w/w) |
| Sand | 912 kg/m$^3$ |
| ¾ inch Aggregate | 1.184 kg/m$^3$ |

Example 3

Figure 4:
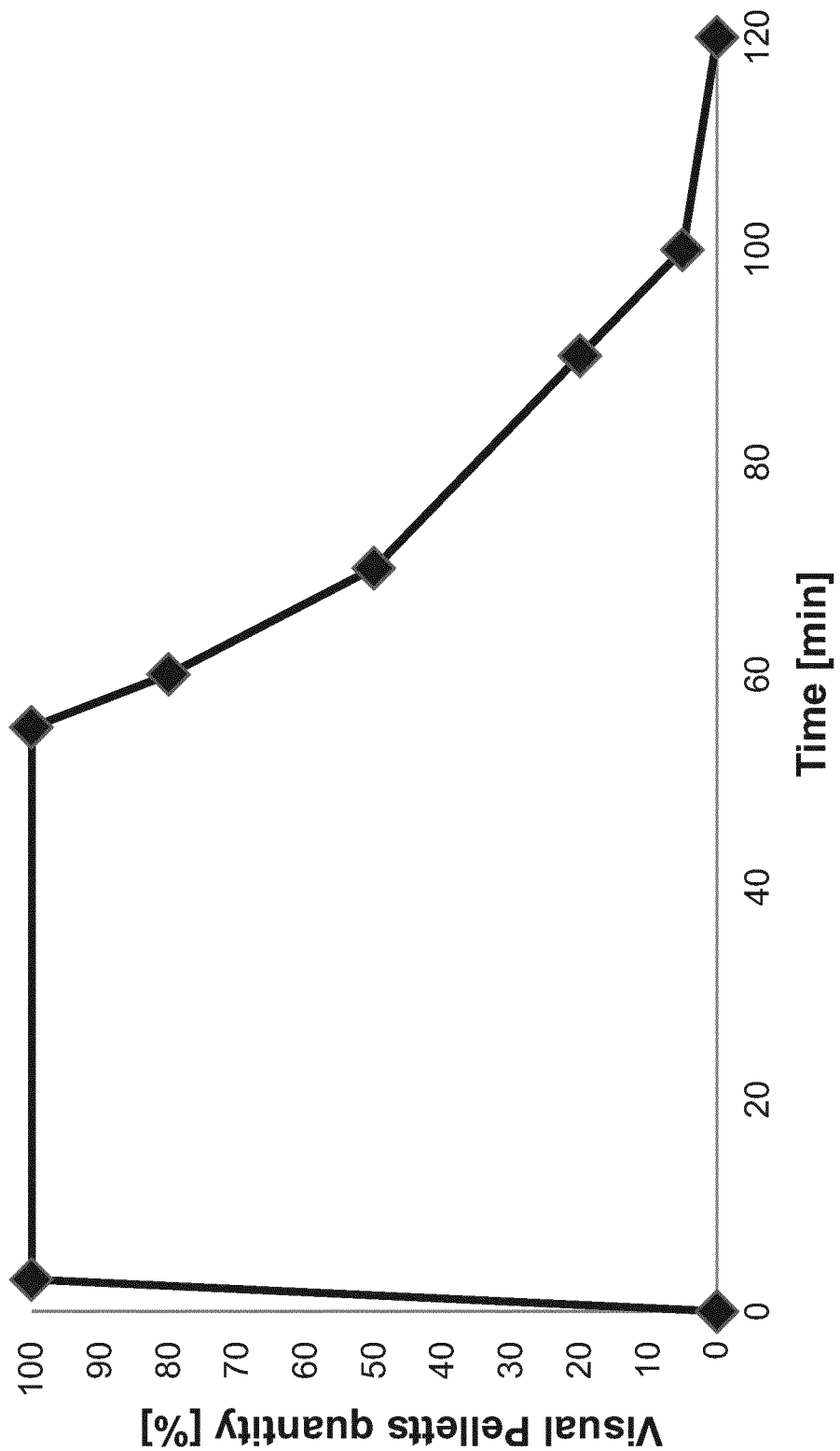
FIG. 4. Detection of Pellets in concrete after adding a pelletizing agent.

S3 slump class concrete with self-curing agent was produced, and the pelletizing agent was then added. The appearance of visual pellets in the concrete was detected over time and the results are shown in FIG. 4.

Mix Design

| Raw Material | kg/m$^3$ |
|---|---|
| CEM I | 300 |
| w/c | 0.54 |
| 0/4 round | 889 |
| 4/8 crushed | 719 |
| 8/11 crushed | 339 |
| Superplasticizer (PCE) | 3.67 |
| Self-curing agent (PEG) | 3 |
| Polysaccharide | 1.333 |

The pellets were discharged from the drum of the concrete truck and poured directly into the sub-base. A roller compacted said pellets to finish the job. Due to the use of a self-curing agent, no need for posterior curing was needed.

Example 4

7 m$^3$ of concrete were produced at a ready-mix plant and introduced in a concrete truck. This concrete had the following composition:

1.260 kg of cement CEM OPC Optimo 40 R
490 kg fly ash
18.2 kg superplasticizer (polycarboxylate ether-based (PCE))
6.398 kg sand
8.316 kg aggregates (1.9 cm size)

0.917 m$^3$ of water were then added to the concrete truck and rotation of the drum started in order to mix the concrete. This concrete had a theoretical density of 2.465. The truck transports the concrete to the jobsite with permanent rotation of the drum. The jobsite was situated 40 min away from the ready-mix plant, therefore the pelletizing agent was only added at the jobsite. At the jobsite, 9.1 kg of pelletizing agent were added to the drum and mixed for 4 minutes with the concrete mix. During these 4 minutes, a clear change of the concrete consistency was observed—the fluid concrete was substituted by a granular material inside the truck. By reversing the movement of the drum, this granular material was discharged from the truck and placed into the paver that placed the granular materials as road bed, following the traditional procedure for normal RCC. After, the concrete was compacted using a traditional roller.

Example 5

4 m$^3$ of concrete were prepared at a central-mix plant with the following mix design:

| Ordinary Portland Cement [Kg/m$^3$] | Fly ash [kg/m$^3$] | w/c | Superplasticizer (w/w) | Sand (% vol) | Coarse Aggregate (% vol) |
|---|---|---|---|---|---|
| 190 | 60 | 0.60 | 0.60% | 47% | 53% |

The blend is pre-mixed in the central plant and discharged into the concrete truck which continues the mixing. Because the jobsite is only 5 minutes away from the central mix, pelletizing agent is also added at the plant, before the truck leaves to the jobsite. Once arrived at the jobsite, the drum is already filled with granular material, which is then discharged directly into the sub-base. Once placed, the roller compacts the concrete, finishing the process.

The invention claimed is:

1. A method for placement of roller compacted concrete (RCC) on a sub-base to produce a concrete pavement, wherein it comprises:
    (a) dosing a concrete or concrete ingredients and loading said concrete or concrete ingredients into a concrete transportation truck, (b) adding at least one pelletizing agent to the concrete and waiting from 3 to 15 minutes under constant mixing to produce a pelletized concrete and (c) discharging the pelletized concrete obtained in step (b) on the sub-base from the concrete transportation truck, rotating the drum of the concrete transportation truck, wherein the concrete or concrete ingredients in step (a) comprises a cementitious binder, the cementitious binder comprises cement.

2. The method according to claim 1, wherein the VB value of said pelletized concrete is classified as V0 to V2.

3. The method according to claim 1, wherein the discharge of the pelletized concrete in step (c) is directly done on the sub-base and uniformly distributed manually or mechanically and pressed using a roller.

4. The method according to claim 1, wherein the discharge of the pelletized concrete in step (c) is done into an asphalt paver.

5. The method according to claim 1, wherein the concrete once placed on the sub-base is compacted using a roller.

6. The method according to claim 1, wherein the concrete of step (a) comprises a self-curing agent and/or an air-entraining agent.

7. The method according to claim 6, wherein a solid active content of said self-curing agent is at a concentration between 0.1-5% (w/w).

8. The method according to claim 6, wherein said self-curing agent is selected from the group consisting of polyvalent alcohol, phytosterols, hyaluronic acid, polyxyethylene (POE), sodium pyrrolidone carboxylate (PCA-Na), cetyl alcohol, stearyl alcohol and poly-acrylic acid.

9. The method according to claim 8, wherein said polyvalent alcohol is selected from the group consisting of polyethylene glycol (PEG), propylene glycol (PG), dipropylene glycol (DPG), butylene glycol, neopently glycol, xylitol, sorbitol and glycerine.

10. The method according to claim 7, wherein the solid active content of said air-entraining agent is at a concentration between 0.1-5% (w/w).

11. The method according to claim 6, wherein said air-entraining agent is selected from the group consisting of salts of wood resins, salts of proteinaceous material, fatty acids, resinous acids, fatty salts, resinous salts, alkylbenzene sulfonate salts, salts of alkyl sulfonates, polyoxyethylene alkyl sulfonate salts, polyoxyethylene alkylaryl ethers, salts of sulfonated lignin and derivatives of hydrocarbon sulfonates.

12. The method according to claim 1, wherein in step (b) the solid active content of the pelletizing agent is at a concentration between 0.3-3 kg/m3 of concrete.

13. The method according to claim 1, wherein said pelletizing agent is selected from the group consisting of cellulose, chitosan, polyacrylics, polyamines, polyvinylalcohols, polysaccharides, collagen, acrylamide, lactic acid, methacrylic acid, methacrylate, hydroxyethyl, ethylene glycol, ethylene oxide, acrylic acid, inorganic flocculants and inorganic coagulants.

* * * * *